Oct. 29, 1940.  V. I. HOOPER ET AL  2,219,897
VALVE STRUCTURE
Filed May 11, 1938  4 Sheets-Sheet 4
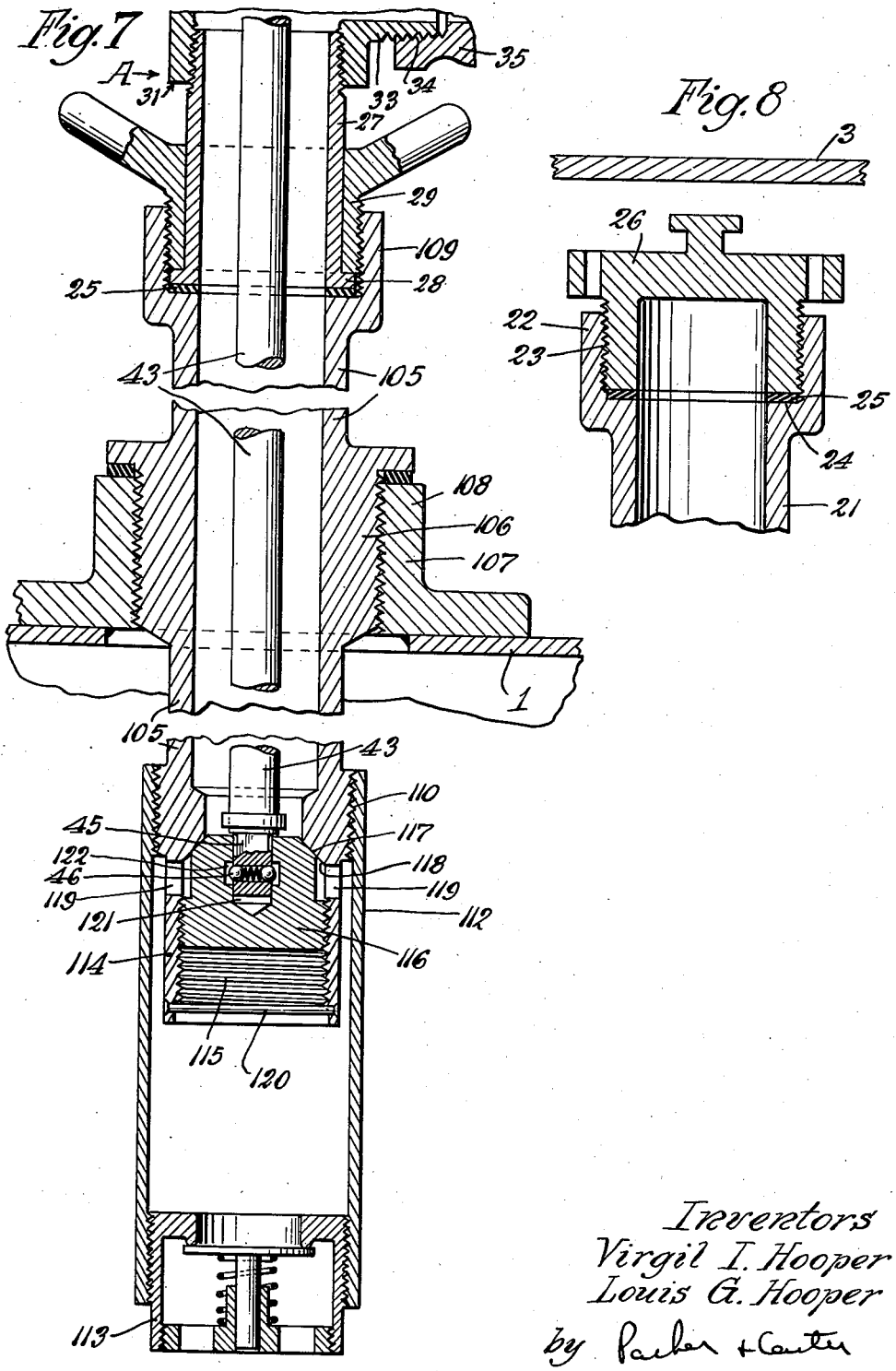
Inventors
Virgil I. Hooper
Louis G. Hooper
by Parker + Carter
Attorneys.

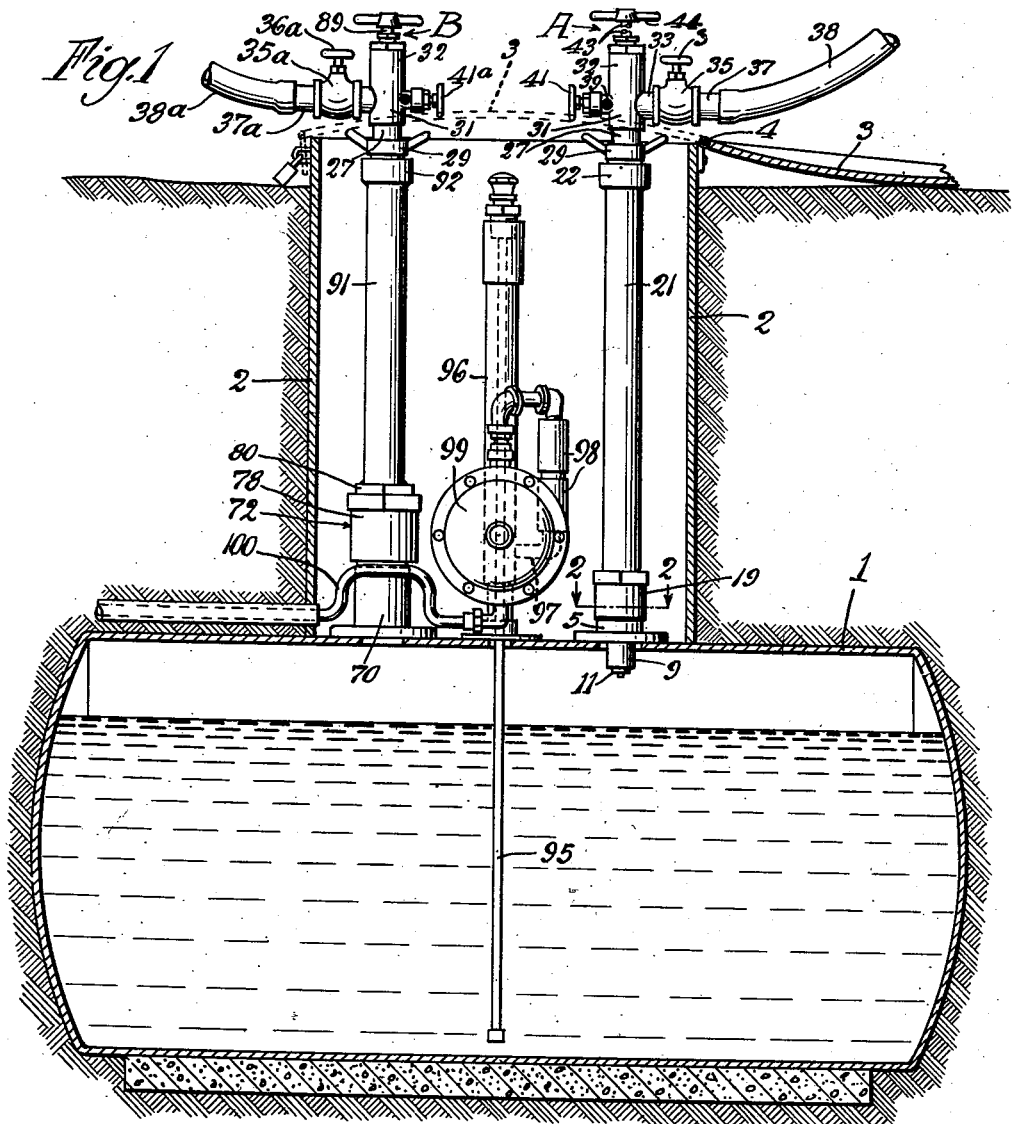

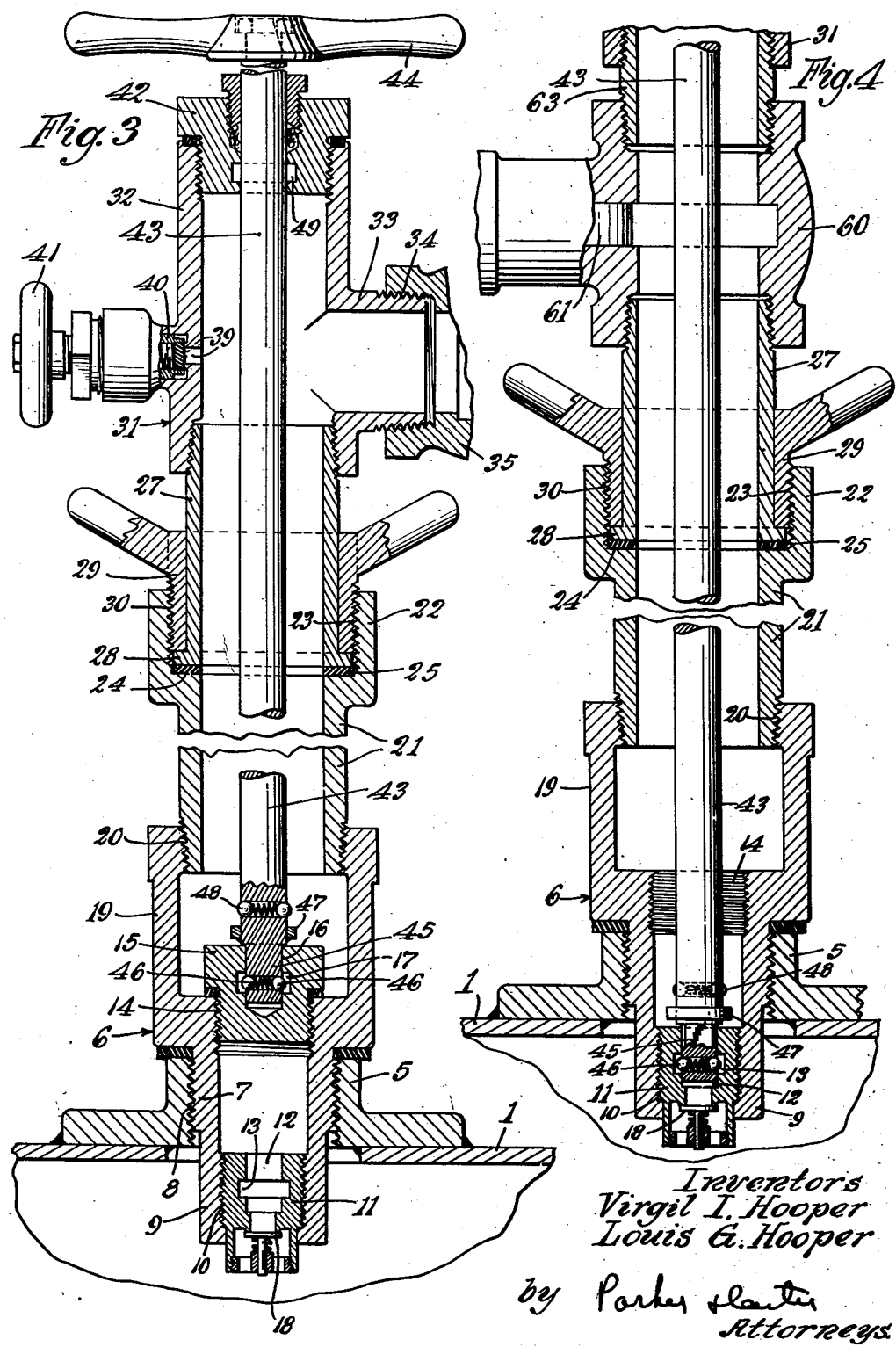

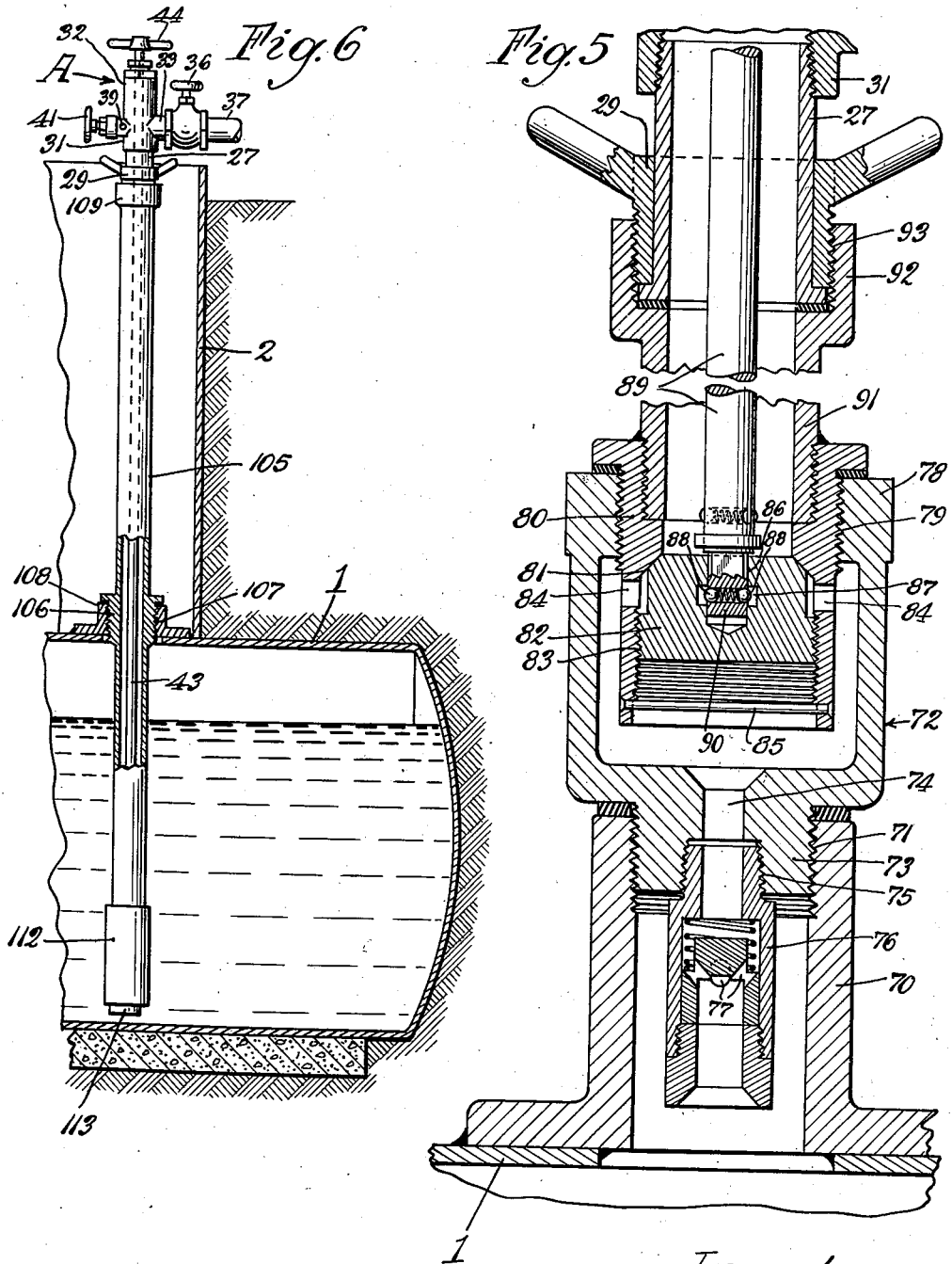

Patented Oct. 29, 1940

2,219,897

UNITED STATES PATENT OFFICE 2,219,897

VALVE STRUCTURE

Virgil I. Hooper, Gordon, Tex., and Louis G. Hooper, Sarepta, La., assignors to The Bastian-Blessing Company, Chicago, Ill., a corporation of Illinois Application May 11, 1938, Serial No. 207,422

10 Claims. (Cl. 62—1)

Our invention relates to the handling of fluids and is particularly adaptable to handling volatile liquids which include or are associated with gases under pressure.

One purpose is the provision of improved loading means for normally fixed tanks such as the buried storage and service tanks employed in dispensing propane, butane or the like.

Another purpose is the provision of improved means for preventing unauthorized tampering with the contents of the tanks.

Another purpose is the provision of improved removable valve assemblies which may be employed in filling or servicing tanks and particularly buried storage or dispensing tanks.

Other purposes will appear from time to time in the course of the specification and claims.

We illustrate our invention more or less diagrammatically in the accompanying drawings wherein:

Figure 1 is a vertical section through a buried storage tank with our valve assemblies in position and ready for loading the tank;

Figure 2 is a section on the line 2—2 of Figure 1;

Figure 3 is a vertical section on an enlarged scale through the loading valve assembly shown in Figure 1;

Figure 4 is a similar section illustrating the application to the loading valve assembly of means for removing the check valve under pressure;

Figure 5 is a partial vertical section on an enlarged scale illustrating the vapor return valve assembly shown in Figure 1;

Figure 6 is a vertical section illustrating a tank with a variant loading valve assembly in place;

Figure 7 is an enlarged vertical partial section of the loading valve assembly shown in Figure 6; and Figure 8 illustrates the communicating passage for the tank after the valve assembly has been removed and with a closure cap in place.

Like parts are indicated by like symbols throughout the specification and drawings.

Referring to the drawings, 1 indicates a tank herein shown as a buried tank and 2 indicates a well upwardly extending from said tank and provided with a removable cover 3, shown as hinged as at 4. For convenience, the loading valve assembly is indicated at A in Figure 1 and the return vapor valve assembly at B. Considering first the loading assembly, shown in greater detail for example in Figures 2, 3 and 4, we illustrate an inwardly screwthreaded nipple 5 located adjacent the loading aperture of the tank. Screwthreaded in relation therewith is a fitting generally indicated as 6 which includes a portion 7, exteriorly screwthreaded as at 8, whereby it is screwthreaded to the nipple. A lower extension 9 is inwardly screwthreaded at 10 to receive any suitable check valve indicated at 11, the details of which do not of themselves form part of the present invention. The check valve body is provided with an aperture 12 having a channel 13, the purpose of which will later appear.

The portion 7 is at its upper end inwardly screwthreaded as at 14 to receive the closure plug 15 which in turn has an aperture 16 provided with a recess 17. The size and form of the aperture 16 and recess 17 are preferably the same as the aperture 12 and recess 13 of the check valve 11. However, the aperture 12 extends all the way through the check valve in order to permit the passage of fluids therethrough, against and about the spring thrust plate or closure 18. The portion 7 has an upward and outward extension generally indicated at 19, the interior diameter of which is substantially greater than the exterior diameter of the plug 15. It is inwardly screwthreaded at the top as at 20 to receive the passage member 21 which extends upwardly in the well 2 to a level somewhat beneath the bottom of the removable closure plate 3. It has an upper flange 22 inwardly screwthreaded as at 23 and provided with a sealing surface 24 upon which may rest any suitable gasket 25.

Referring to Figure 8, any suitable closure cap or plug 26 may be screwthreaded into the threads 23 when access to the interior of the tank is not desired.

When the operator wishes to fill the tank, he removes the cap 26 and applies the loading valve assembly shown in detail in Figure 3. It includes the removable passage member 27 with a bottom ledge 28 abutting against the gasket 25. 29 is a wing nut exteriorly threaded as at 30 to engage the threads 23 whereby in response to rotation of the wing nut the removable passage member 27 is firmly locked in relation to the normally fixed passage member 21. Secured to the top of the passage member 27 is the L 31 having an upwardly extending arm 32 and a lateral arm 33. The lateral arm is exteriorly screwthreaded as at 34 to receive any suitable valve housing 35 in which is a valve controlled by the exterior handle 36. 37 is any suitable loading passage which may extend to a source of supply or to which may be secured any suitable flexible loading line 38.

39 is a vent aperture controlled by any suitable valve structure generally indicated as 40 which in turn is manipulated by an exterior handle 41. The upper end of the member 32 is closed by a cap 42 in which is slidably and rotatably mounted the stem 43 with the exterior handle 44. It is provided at its lower end with a squared or otherwise formed portion 45 adapted to penetrate selectively either the aperture 12 or the aperture 16. It is provided with spring thrust balls 46 adapted to set in the recesses 13 or 17. 47 is any suitable abutment adapted to limit the upward withdrawal of the stem 43. 48 indicates additional spring thrust balls adapted to penetrate the recess 49 in the member 42, whereby when either the plug 15 or the check valve 11 are upwardly withdrawn, unintended downward movement of the stem is prevented.

Referring to Figure 4, we illustrate the application to the above described assembly of removable means for permitting the operator or repair man to withdraw the check valve 11 for repair or inspection without permitting the escape of the contents of the tank. In this unit there is applied to the removable passage 27 a gate valve housing 60 in which is mounted the gate valve 61 controlled by any suitable exterior handle. 63 indicates an upper passage which may be provided with any suitable top closure not herein shown for carrying the stem 43. It will be understood that the stem 43 may then first be applied to the plug 15 and the plug may be removed upwardly above the gate valve 61. The gate valve is then shut, the stem is withdrawn, and the plug 15 is removed. The operator then returns the stem 43, opens the gate valve 61, inserts the stem 43 to operative contact with the check valve 11, unscrews it, and upwardly withdraws it above the gate valve 61. The gate valve 61 is then closed and the check valve may be removed for inspection or repair.

It will be understood that either the counterpart of the structure shown in Figure 3 or any other suitable means may be employed for closing the interior of the passage 63 to the atmosphere prior to the opening of the gate valve 61 and the insertion of the stem 43 therethrough.

Referring to Figure 5, which constitutes the vapor return valve assembly, we illustrate an upwardly extending nipple or passage 70 which is inwardly screwthreaded at its upper end as at 71 to receive the fitting generally indicated as 72, which includes a reduced lower portion 73 exteriorly screwthreaded to receive the threads 71. It has a passage herein shown as a central passage 74 with an interiorly screw threaded enlargement 75 which receives the excess vapor valve structure 76, the details of which do not of themselves form part of the present invention. It will be understood, however, that it is a valve which permits a predetermined flow of vapor upwardly through the passage 74 but which closes in response to a predetermined excess vapor flow.

In the particular form here shown, the speed of the flow through the apertures 77 will close the valve. The upper end of the member 72 is provided with an inward thickening 78, inwardly screwthreaded as at 79 to receive the fitting 80. The fitting 80 has an inward beveled sealing surface 81 to which is opposed the corresponding sealing surface on the screwthreaded locking plug 82. The locking plug is in screw threaded engagement with the interior of the member 80 as at 83. When it is in the closed position in which it is shown in Figure 5, it masks a plurality of vapor outlet passages 84 in the member 80. 85 is any suitable limit pin or member adapted to limit the downward movement of the plug 82 when it is rotated to unlocked position to unmask the apertures 84.

86 indicates an aperture in the plug 82 and 87 a recess in said aperture to receive the spring thrust balls 88 on the squared end 90 of the pin 89, which is similar to the pin 43 earlier described. 91 is a passage member screw-threaded to or otherwise secured to the member 80. It terminates in an upward expansion 92 inwardly screwthreaded as at 93 to receive either any suitable closure cap 26, such as shown in Figure 8, or a removable valve assembly, such as is shown in Figure 5, including the member 27 and wing nut 29 as earlier described in connection with Figure 3.

Referring generally to the structure of Figure 1 and the figures above described, and considering the operation thereof, the interior of the tank may be gauged by any suitable slip tube gauge 95, the details of which do not of themselves form part of the present invention. 96 is an upward extension or passage member in which the slip tube gauge 95 is slidably mounted. 97 is a gas escape passage in communication with any suitable excess flow valves 98 and the regulator 99. 100 indicates the service supply line extending from the gauging and regulating assembly to the point of use.

In filling the tank the operator may drive a truck adjacent the tank. When he reaches the tank he finds the normally fixed passage members 21 and 91 closed at their tops by the caps 26. He obtains access to these caps by lifting the lid 3 and removes them. The operator then applies the removable valve assemblies as indicated at A and B in Figure 1. The flexible line 38 may be employed to deliver the liquid, propane, butane, or the like, through the valve housing 35 to the interior of the loading valve assembly. Before permitting the liquid to flow, however, the operator inserts the stem 43, engages the lower end 45 with the aperture 16 of the plug 15, unscrews the plug, and withdraws it to inoperative position with the balls 48 penetrating the recess 49 of the member 42. The operator can then permit flow through the valve housing 35 by manipulating the handle 36. In some instances, no vapor return is necessary and the assembly B would not be applied. But assume that it is applied, the operator similarly opens the plug 82 by employing the corresponding stem 89 of the vapor return valve assembly B. He rotates the plug 82 until it engages the pin 85, thus unmasking the vapor outlets 84.

It will be understood that the valve housing 35a of the vapor return valve assembly B is in communication with an outlet passage 37a to which may be secured the flexible vapor return line 38a, which may return to the truck or source of supply. A manipulation of the handle 36a thus permits vapor to escape from the tank 1 upwardly through the excess vapor flow valve 76 and the passage 74 and through the apertures 84 and upwardly through the passage member 91, outwardly through the valve assembly B and thus back to the tank. The slip tube gauge 95 may be set or applied to permit the operator to determine when sufficient liquid has been supplied to the tank. When sufficient liquid has been poured, the operator can terminate further flow of liquid by moving the valve handle 36 to closed position. This terminates further flow of liquid into the tank. The operator can then return the plug 15 to closed position. He can then vent the interior of the valve assembly A by moving the handle 41 to open position. This permits the escape of pressure from the removable valve assembly, thus making its removal easy. It also permits the operator to determine whether or not the plug 15 has been seated sufficiently tightly to prevent undesired escape of liquid or gas from the tank. After the venting, and assuming that the plug 15 has been tightly closed, the operator can move the wing nut 29 and thereby release the entire removable loading assembly. He then returns the cap 26 to position.

If the return vapor line assembly has been employed, the operator similarly closes the plug 82 which terminates any further escape of gas or vapor from the tank. He moves the valve handle 36a to closed position, thus preventing any escape of gas or vapor from the truck into the assembly B. He can then vent the assembly B by manipulating the handle 41a and determine whether or not the plug is tightly closed. He may then remove the entire removable vapor return valve assembly and replace the cap 26, close the removable cover plate 3, and go on to his next job. It is only if he wishes to have access to the check valve 11 for repair or service or inspection that he employs the gate valve structure shown in Figure 4.

Referring to Figures 6 and 7, we illustrate a variation of the above described structure in which the closure plug is located in the tank itself. Figure 6 illustrates simply the loading valve side, but it will be understood that the other side may be similarly modified. In the form of Figures 6 and 7, a unitary passage structure 105 has an intermediate enlargement 106 exteriorly screw-threaded as at 107 to be received in the nipple 108. The passage member 105 carries at its uppermost end an enlargement 109 which is screw-threaded to receive either a closure plug 26 or a valve assembly A as indicated in Figures 6 and 7.

At its lowermost end the passage member 105 is screwthreaded as at 110 to receive an interior screwthreaded sleeve 112 which is closed at its lower end by any suitable check valve 113. The passage member 105 is provided with a tubular sleeve 114 which depends below screwthreaded portion 110 within the sleeve 112. The tubular sleeve 114 is inwardly screwthreaded as at 115 in which is screwthreaded a locking plug 116, similar in construction to the locking plug 82 previously described. The plug 116 is provided with a conical sealing face 117 to engage a corresponding beveled sealing surface 118 in the tubular sleeve 114. When the plug 116 is in the closed position, as shown in Figure 7, it masks a plurality of inlet passages 119. A limit pin 120 limits the downward movement when it is rotated to unlocked position to unmask the passages 119 by means of the stem 43 of suitable length in the loading valve assembly A. The plug 116 is provided with a square socket 121 and a recess 122 to receive the squared end 45 and spring thrust balls 46 of the stem 43.

We claim:

1. In combination with a tank having an aperture, a fitting associated with said aperture, and having a passage in communication with said aperture and tank, a valve cage removably mounted in said fitting passage, and having a pressure responsive, inward opening valve element mounted in it, and a closure member removably mounted wholly within and adjacent the inner end of the passage of said fitting in addition to said valve element, and a third closure member, for said fitting, removably positioned outwardly of said first mentioned additional closure member.

2. In combination with a tank having an aperture, a fitting associated with said aperture, and having a passage in communication with said aperture and tank, a valve cage removably mounted in said fitting passage, and having a pressure responsive valve element, and a closure member removably mounted in the passage of said fitting, and unitary means effective for the successive removal of both said valve member and said closure, including a housing, and means for removably securing it in sealing relationship to said fitting, and a tool movably mounted in said housing, said tool including a portion adapted to mate both with said closure member and with said valve member, whereby in response to manipulation of said tool, said closure member and subsequently said valve member may be removed, said tool including a handle portion extending exteriorly of said removable housing.

3. In combination with a tank having an aperture, a hollow fitting associated with said aperture and being in communication with said aperture and tank, said fitting including a hollow passage member extending upwardly a substantial distance above the top of the tank, and a passage member extending a substantial distance downwardly into the tank, a valve cage mounted in the passage member which penetrates into the tank, a pressure responsive element within said cage, a closure for said fitting, means mounted on said fitting for moving said closure within said fitting selectively into and out of closing position, including a housing, and means for removably sealing said housing in relation to said upper passage member, and a tool longitudinally and rotatably movable in said housing, said tool including an exterior handle, and a portion adapted for operative engagement with said closure.

4. In combination with a tank having an aperture, a hollow fitting associated with said aperture and being in communication with said aperture and tank, said fitting including a passage member extending a substantial distance downwardly into said tank, a valve mounted in the passage member which penetrates the tank, and a pressure responsive element associated with said valve, a closure for said fitting in addition to said valve, and means for selectively moving said closure into and out of closing position, including a removable, pressure tight housing, means for removably sealing said housing in pressure tight relation to the upper end of said fitting, and a tool longitudinally movable in said housing, said tool having a portion adapted for positive operative engagement with said closure, and an exterior handle.

5. In combination with a tank having an aperture, a valve assembly, means for removably securing said valve assembly in relation to said tank and aperture, and means for removing said valve assembly, said last mentioned means including a passage member, said valve assembly shaped and dimensioned for removal through said passage member, means for removably securing said passage member in relation to said tank and aperture, while the valve assembly is in position, a removable head member mounted on said passage member, a tool slidable and rotatable in said head member and including a portion adapted positively to engage a portion of said valve assembly, exterior means for actuating said tool and for thereby unseating said valve assembly from the tank, the interior of said passage member being normally closed to the atmosphere, a valve intermediate the ends of said passage member and means for actuating it and for thereby closing said passage member after the valve assembly has been withdrawn above said valve.

6. In combination with a tank having an aperture, a valve assembly, means for removably securing said valve assembly in relation to said tank and aperture, and means for removing said valve assembly, said last mentioned means including a passage member, means for removably securing said passage member in relation to said tank and aperture while the valve assembly is in position, a removable head member mounted on said passage member, a tool slidable and rotatable in said head member and including a portion adapted positively and operatively to engage a portion of said valve assembly, exterior means for actuating said tool and for thereby releasing said valve assembly from the tank and for moving it through said passage member, the interior of said passage member being normally closed to the atmosphere, a valve intermediate the ends of said passage member and means for actuating it and for thereby closing said passage member after the valve assembly has been withdrawn through the passage member to a point above said valve, and independent means for venting the interior of said passage member.

7. In combination with a tank having an aperture, a valve assembly, means for removably securing said valve assembly in relation to said tank and aperture, and means for removing said valve assembly as a unit, including a passage member, means for removably securing said passage member in relation to said tank and aperture while the valve assembly is in position, means associated with said passage member for removing said valve assembly, and for withdrawing it outwardly through said passage member, and means for closing said tank during the removal of said valve assembly.

8. In combination with a tank having an aperture, a valve assembly, means for removably securing said valve assembly in relation to said tank and aperture, and means for removing said valve assembly, including a passage member, means for removably securing said passage member in relation to said tank and aperture while the valve assembly is in position, means associated with said passage member for removing said valve assembly as a unit, and for withdrawing it outwardly through said passage member and for returning and reseating it, and means for closing said tank during the removal of said valve assembly, including a valve adapted to close said passage member, said valve being located intermediate the ends of said passage member.

9. In combination with a tank having an aperture, and a passage member extending upwardly from said aperture, a lower closure in said passage located in a lower portion of said passage member, and an additional upper closure adjacent the upper end of said passage member, and means for opening and for replacing said lower closure through said passage member, including a member removably securable to the upper end of said passage member when said upper closure is removed, and a tool longitudinally movable in said member and including a portion adapted for positive, operative engagement with said lower closure.

10. In combination with a tank having an aperture and a passage member extending upwardly from said aperture, a plug screw-threaded in a portion of said passage member remote from its upper end and closing passage through said passage member, and means for moving said plug into and along said passage member, including a hollow member removably securable to the upper end of said passage member, and a tool longitudinally and rotatably mounted on and movable in said hollow member, said tool including a portion adapted for operative engagement with said plug, exterior means for rotating said tool and plug and for thereby opening said passage, and positive and fixed means for limiting the longitudinal movement of said plug after it has been opened.

VIRGIL I. HOOPER.
LOUIS G. HOOPER.